United States Patent
Upreti et al.

(10) Patent No.: US 11,196,559 B2
(45) Date of Patent: Dec. 7, 2021

(54) SECURE COMMUNICATION USING MULTICHANNEL NOISE

(71) Applicant: International Business Machines Corporation, Armonk, NY (US)

(72) Inventors: Sanjay Upreti, Lexington, KY (US); Brandon S Johnson, Lexington, KY (US)

(73) Assignee: International Business Machines Corporation, Armonk, NY (US)

(*) Notice: Subject to any disclaimer, the term of this patent is extended or adjusted under 35 U.S.C. 154(b) by 196 days.

(21) Appl. No.: 16/058,043

(22) Filed: Aug. 8, 2018

(65) Prior Publication Data

US 2020/0052895 A1  Feb. 13, 2020

(51) Int. Cl.
*H04L 29/06* (2006.01)
*H04L 9/12* (2006.01)
*H04L 29/08* (2006.01)

(52) U.S. Cl.
CPC ............ *H04L 9/12* (2013.01); *H04L 63/0428* (2013.01); *H04L 67/10* (2013.01)

(58) Field of Classification Search
CPC ........ H04L 9/12; H04L 63/0428; H04L 67/10
See application file for complete search history.

(56) References Cited

U.S. PATENT DOCUMENTS

| | | | |
|---|---|---|---|
| 3,902,175 A | 8/1975 | Winzer | |
| 4,223,399 A * | 9/1980 | Hackett | G01V 1/375 367/41 |
| 5,901,183 A | 5/1999 | Garin | |
| 8,456,349 B1 * | 6/2013 | Piesinger | G01S 13/06 342/29 |
| 9,900,047 B2 | 2/2018 | Jayasimha | |
| 10,523,707 B2 * | 12/2019 | Sharifi Mehr | H04L 63/166 |
| 2014/0133614 A1 * | 5/2014 | Huntley | H04L 7/0087 375/355 |
| 2014/0173292 A1 * | 6/2014 | El Khoury | G06F 21/6218 713/189 |
| 2015/0276937 A1 * | 10/2015 | Knowland | G01T 1/161 600/431 |
| 2017/0099171 A1 | 4/2017 | Kim | |

(Continued)

OTHER PUBLICATIONS

Jouguet et al., "Long-distance continuous-variable quantum key distribution with a Gaussian modulation." Physical Review A 84.6 (2011): 062317.

(Continued)

*Primary Examiner* — Anthony D Brown
*Assistant Examiner* — Rodman Alexander Mahmoudi
(74) *Attorney, Agent, or Firm* — Jeffrey S LaBaw; Steven J Meyers; Erik Johnson (57) ABSTRACT

A method, apparatus and computer program product for secure communication includes receiving a message for transmission from a transmitting node to a receiving node. The message is split into a plurality of channels and each channel receives an identical copy of the message. Noise data is added to each version of the message. The noise data is different for a respective copy of the message than any other version of the message thus producing a plurality of ciphers each for a respective channel. The ciphers are transmitted via the respective channels from the transmitting node to the receiving node.

18 Claims, 9 Drawing Sheets

(56) References Cited

U.S. PATENT DOCUMENTS

2018/0089863 A1 3/2018 Marschner
2019/0044916 A1* 2/2019 Jones .................. H04L 63/0421

OTHER PUBLICATIONS

Vali et al., "Effect of Rayleigh fading on non-coherent sequence synchronization for multi-user chaos based DS-CDMA." Signal Processing 90.6 (2010): 1924-1939.
Jouguet et al. "Experimental demonstration of long-distance continuous-variable quantum key distribution." Nature photonics 7.5 (2013): 378-381.

* cited by examiner

SECURE COMMUNICATION USING MULTICHANNEL NOISE

BACKGROUND OF THE INVENTION

This disclosure relates generally to secure communication between computer systems. More particularly, it relates to secure communication using encryption and noise in a multichannel transmission medium.

Encryption is an essential part of modern digital communication. Various techniques have been used to encrypt information transmitted between two entities since humans found the need for privacy in communication. For example, the Caesar cipher was used by Julius Caesar for his private correspondence and featured a simple substitution cipher in which each letter is replaced by another letter a fixed number of positions in the alphabet. With time, the techniques have improved. Today, sophisticated arithmetic techniques are used in cryptosystems using Diffie-Hellman, Rivest-Shamir-Adleman (RSA), the Advanced Encryption Standard (AES) and the Digital Signature Standard (DSS) based architectures. These techniques, using symmetric key exchange (e.g., private key) or asymmetric key exchange (e.g., public-private key) are used in the present day secure communications and have had success in protecting the privacy and integrity of electronically transmitted information. These techniques rely on the fact that a "brute force" decryption of the ciphertext or encrypted information in any reasonable timeframe would require computing resources beyond the capabilities of all but a few supercomputers.

Nevertheless, computers are getting ever more powerful and sophisticated. The problem with currently popular algorithms is that their security relies on one of three hard mathematical problems: the integer factorization problem, the discrete logarithm problem or the elliptic-curve discrete logarithm problem. All of these problems can be easily solved on a sufficiently powerful quantum computer. It has been predicted that with such a quantum computer, encryption as is practiced currently is at risk from brute force attacks and can be solved in short time periods, even in real-time with sufficiently powerful quantum computers, to reveal the encrypted message.

The present invention addresses these concerns by proposing a new technique that is not reliant on the difficulty of decrypting information protected by advanced encryption techniques.

BRIEF SUMMARY

According to this disclosure, a method, apparatus and computer program product for secure communication includes receiving a message for transmission from a transmitting node to a receiving node. The message is split into a plurality of channels and each channel receives an identical copy of the message. Noise data is added to each version of the message. The noise data is different for a respective copy of the message than other versions of the message, thus producing a plurality of ciphers, each for a respective channel. The ciphers are transmitted via the respective channels from the transmitting node to the receiving node.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, preferred embodiments of the invention provide a system, method and computer program product for secure communication. In embodiments of the invention, each of a plurality of copies of a signal (plaintext data, for example) are combined into a respective one of a plurality of independent noise data envelopes. Each combined signal/noise envelope or "cipher" is transmitted in a respective channel to a receiving node. Within a given noise data envelope, in preferred embodiments, each signal copy is phase-shifted. In these preferred embodiments, each of the copies is preferably phase-shifted by a unique amount. The signal will be well hidden amongst the noise in any given channel. When received, the signal can later be reconstituted provided a sufficient number of channels are available for integration.

Figure 1:
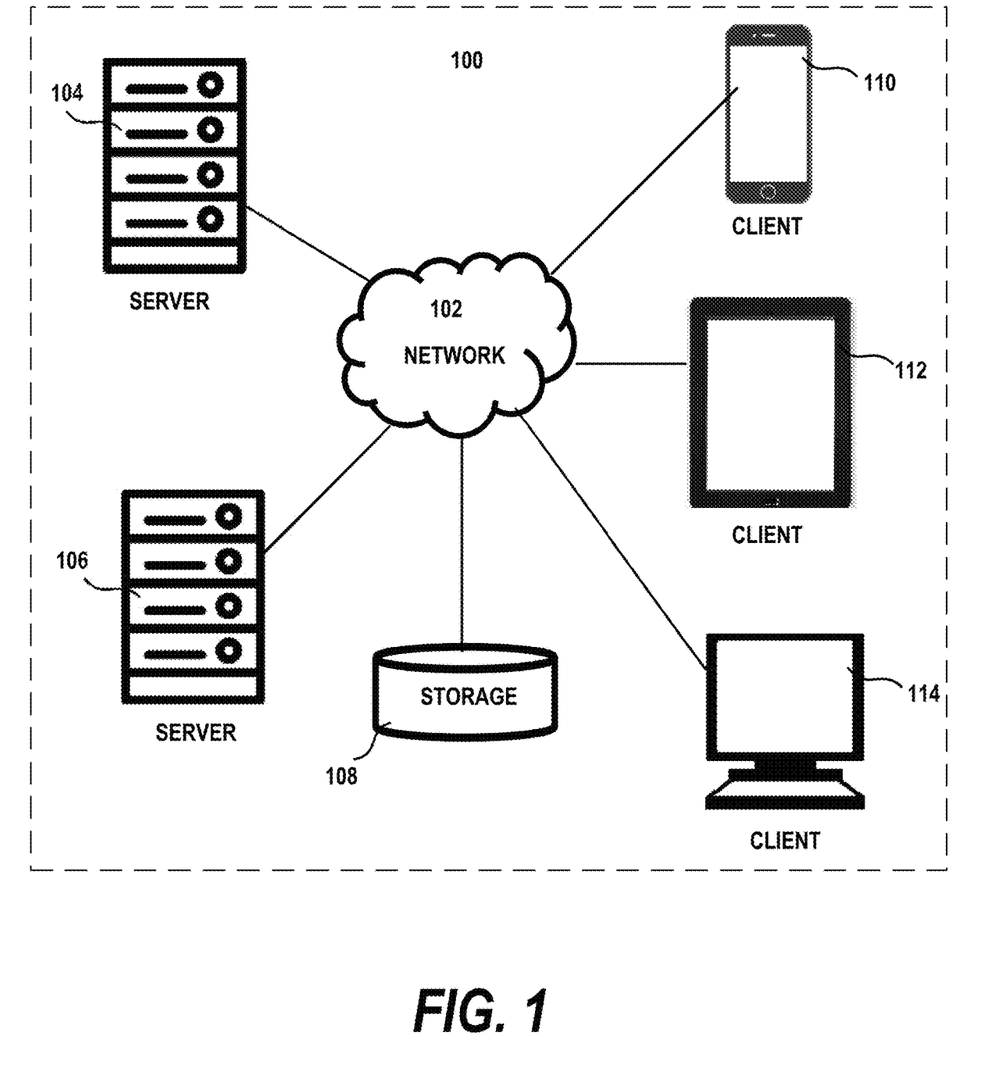
FIG. 1 depicts an exemplary block diagram of a distributed data processing environment in which exemplary aspects of the illustrative embodiments may be implemented.
Figure 2:
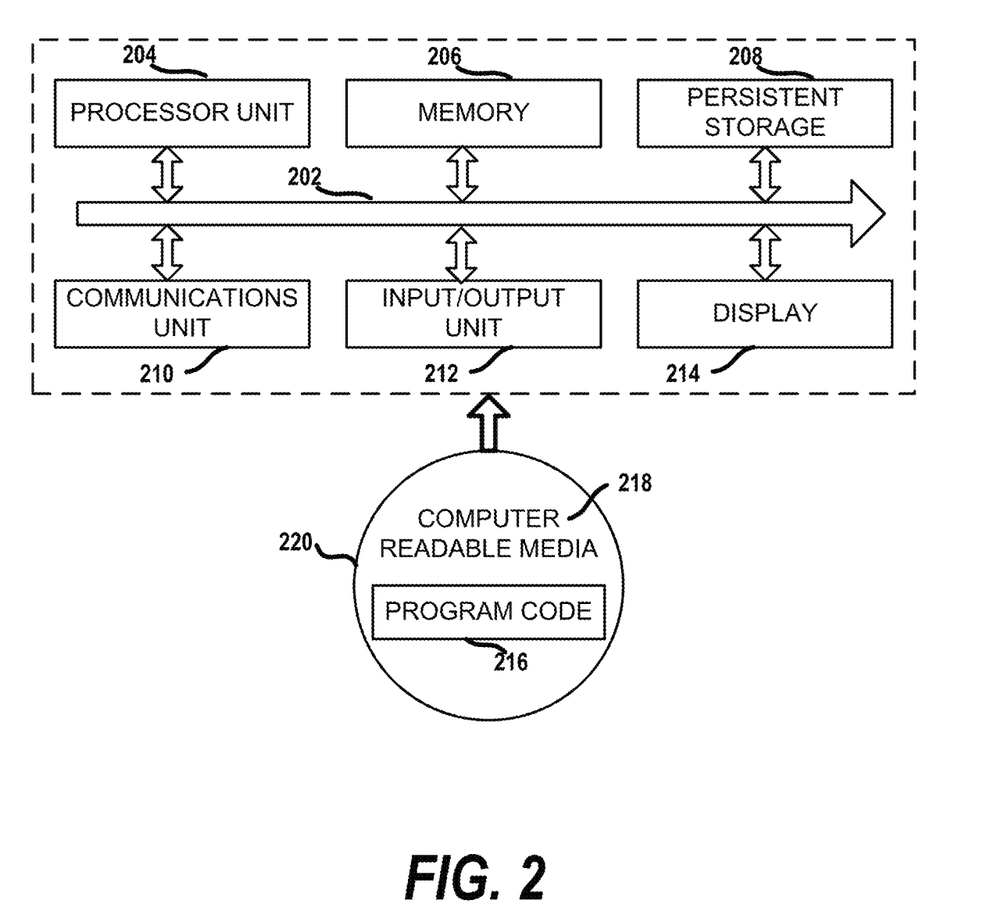
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Python, Matlab, Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

A new approach to cryptography is presented in this disclosure. This method relies on the nature of random noise and the linearity of superposition of signals. When a signal such as plaintext is added to a random noise, the product of the combination of signal and noise is not reversible. In the present disclosure, the combination of signal and noise is called a "cipher". An example of noise which may be added to a signal is Gaussian noise. If the same plaintext signal is added to another random noise signal, another non-reversible cipher is obtained. If N ciphers or "channels of ciphers" are created, and thereafter combined, provided that knowledge of how a respective cipher is encrypted is known by the receiving node, the signal-to-noise ratio (SNR) for the combined cipher is improved by a factor of the square-root of N as compared to any individual cipher. This is because of the random nature of the added noise data where only the variance is added with additional channels, whereas for signals, due to the repetition of the signal, the amplitudes scale up linearly with N, where N equals the number of channels.

In embodiments of the invention, the transmitter and receiver establish how many such "channels" or "ciphers" are created, establish a starting SNR for a given signal and establish a mechanism to combine the created ciphers in phase between the sender and the receiver during a negotiation phase. In embodiments of the invention, each channel or a sufficient number of channels will phase-shift the signal within a noise data envelope by a unique amount.

Thus, embodiments of the invention provide a new cryptosystem. Encryption according to the invention will be less vulnerable to the improved abilities of computers such as quantum computers (QCs). Pure computing power will not make the decryption of such ciphers possible. Rather, embodiments of the invention rely on the fact that different channels or ciphers are transmitted independently of each other and phase-shifted independently of one another and are therefore more difficult to intercept and combine correctly.

Further, as will be described in greater detail below, the sender and receiver will negotiate which dispersion mechanism will be used. For example, a dispersion mechanism which sends the channels out of phase may be selected in the negotiation, if desired. In other embodiments, additional selected respective encryption techniques are used for each of the selected channels as well. The security of this technique relies on the fact that unless all the channels are known, a sufficiently large number of them are acquired at the same time and synchronization of the channels (de-dispersion) is achieved, i.e. the adversary knows how each channel is phase-shifted and hence knows the PSK, the decryption will be nearly impossible.

The dispersion of the channels can be achieved in different ways by different embodiments of the invention. In one embodiment, the data in each channel is rotated by a different but pre-set amount. In another embodiment of this process, an invertible transfer function is used to transform each of the channels. "Man-in-the-middle" attacks become practically impossible because they require the attacker to first know how many channels are needed and which are those channels, then know which channels contain which data, what is the starting SNR, what is the dispersion algorithm and what was the initial coding of the plaintext to numeric values. The inventors have calculated that in the simplest form of the invention, a brute-force attack may require at a minimum of $2^{36880}$ number of attempts which is approximately $10^{11102}$ integer operations for a 4 k packet of data.

Figure 3:
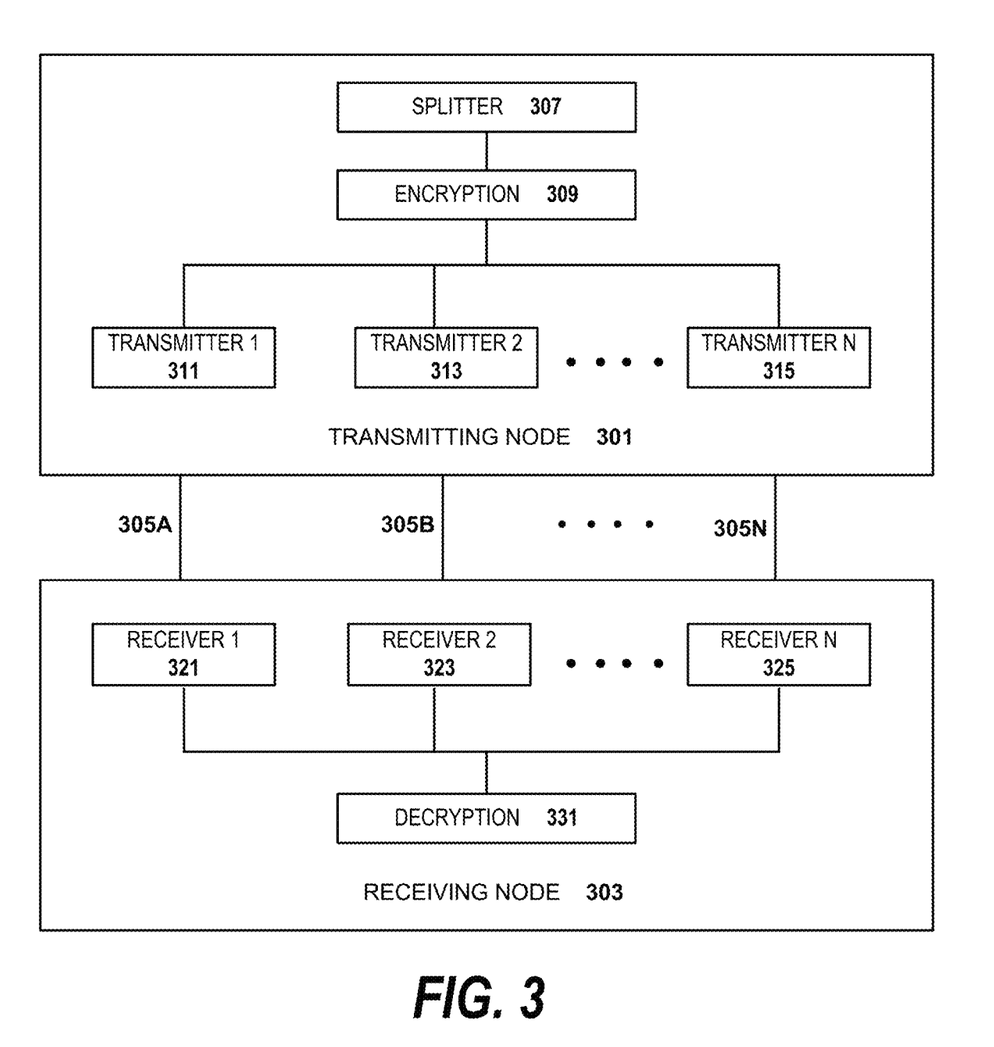
FIG. 3 illustrates an architectural diagram of components in the encryption and decryption systems according to an embodiment of the invention.

FIG. 3 illustrates an architectural diagram of components in the encryption and decryption systems according to an embodiment of the invention. The diagram is simplified by only representing the components for transmitting and receiving the encrypted ciphers. In most embodiments of the invention, the components at each system would be symmetric, i.e. capable of both transmission and reception. Although the components are listed in functional block, for one skilled in the art will appreciate that they represent physical combinations of hardware, software and firmware used in different embodiments of the invention.

Transmitting node 301 transmits the encoded message to receiving node 303 via a plurality of channels 305A-305N. Each of the channels is used to transmit a different cipher containing the same information. That is, each channel contains the complete signal, however, due to the noise data and the phase-shift of the signal with respect to the introduced noise data, each cipher is unique and independently irreversible.

In more detail, the transmitting node 301 uses a splitter 307 to split the original message into a plurality of copies. Then, an encryption module 309 is used to encrypt each of the copies into a different cipher. In the simplest embodiment, the encryption module adds a different random or pseudo-random noise to a respective copy of the plaintext message, i.e. the signal to create the respective cipher. In preferred embodiments of the invention, at least a minimum number of the signal copies are phase-shifted with respect to the respective noise data to further obfuscate the signal within the cipher. For the 16 channel embodiment, in preferred embodiments, the signal in every channel should be phase-shifted by a different amount with respect to its noise envelope. In more complicated versions of the invention, the resulting cipher can also be encrypted by conventional means, e.g., with a symmetric or asymmetric encryption algorithm. In some embodiments, the selected encryption algorithm is specific to the channel.

A plurality of transmitters 311, 313 and 315 are used to transmit respective versions (ciphers) of the encrypted information in a respective channel to the receiving node 303. In embodiments of the invention, a single transmitter is used to transmit the respective ciphers on the appropriate channel. That is, a channel is a physical or logical entity in different embodiments of the invention. For example, the channels can be time or frequency multiplexed using a single transmitter. Different channels can be assigned to different ports of the computer to further obfuscate the signal. Using header information, for example, a single receiver can distinguish which packet or block belongs to a respective channel.

The number of ciphers created, and therefore, the number of channels differs in respective embodiments. However, through experimentation, the inventors have determined that 16 channels provide sufficient resolution of the signal. Greater numbers of channels increase the resolution of the signal and offer some redundancy in the event that some channel are not received. The number of channels should be selected to be large enough to achieve the desired signal accuracy when the ciphers are combined into the combined cipher. While greater numbers of channels can be used in alternative embodiments, more channels may be an overuse of bandwidth and computing resources. One consideration is the desired error-rate. Starting with a SNR of 2 sigma for each cipher, with 16 channels, one achieves a combined cipher with an SNR of about 8-sigma—sufficient for original signal integrity. While the 8-sigma criteria is used frequently in the description of the invention, other measures of statistical significance can be used in alternative embodiments of the invention. For implementations of the invention, a 6-sigma statistical significance (or even lower) can be adequate for the desired signal accuracy. What is needed is for the signal in the combined cipher to be statistically significant, while the signal in each of the individual ciphers to be hidden by the noise data.

A plurality of receivers 315, 317, 319 respectively receive the encrypted messages from each of the channels. In embodiments of the invention a single receiver can be used to receive all of the individual channels given the port, block or header information. Depending on the hardware implementation, one could use a single transmitter-receiver combination with time or frequency-multiplexed "channels" or multiple transmitters each transmitting a single "channel". A "channel" is a mode of transmission of one respective cipher of encrypted data. Alternative embodiments transmit all channels simultaneously over a large bandwidth, transmit them time-multiplexed over a narrow band or a combination thereof. As an example, one could transmit them over a TCP-IP port time-multiplexed with no particular order for each of the channels.

Next, the ciphers from each of the channels are assembled by the decryption module 321 so that the original message can be recovered. Depending on the embodiment of the invention, the respective cipher may need to be decrypted with a pre-shared key (PSK) if the channel has been encrypted according to the rules set up by the transmitting node 301 and the receiving node 303. As will be discussed below, the pre-shared keys in the present invention take two forms. A first type of PSK represents the amount of phase-shift of the signal within a noise data envelope for a particular channel. A second type of PSK is a conventional symmetric or asymmetric key. In embodiments of the invention, a particular channel may have PSKs of both the first and second type for extra security.

Figure 4:
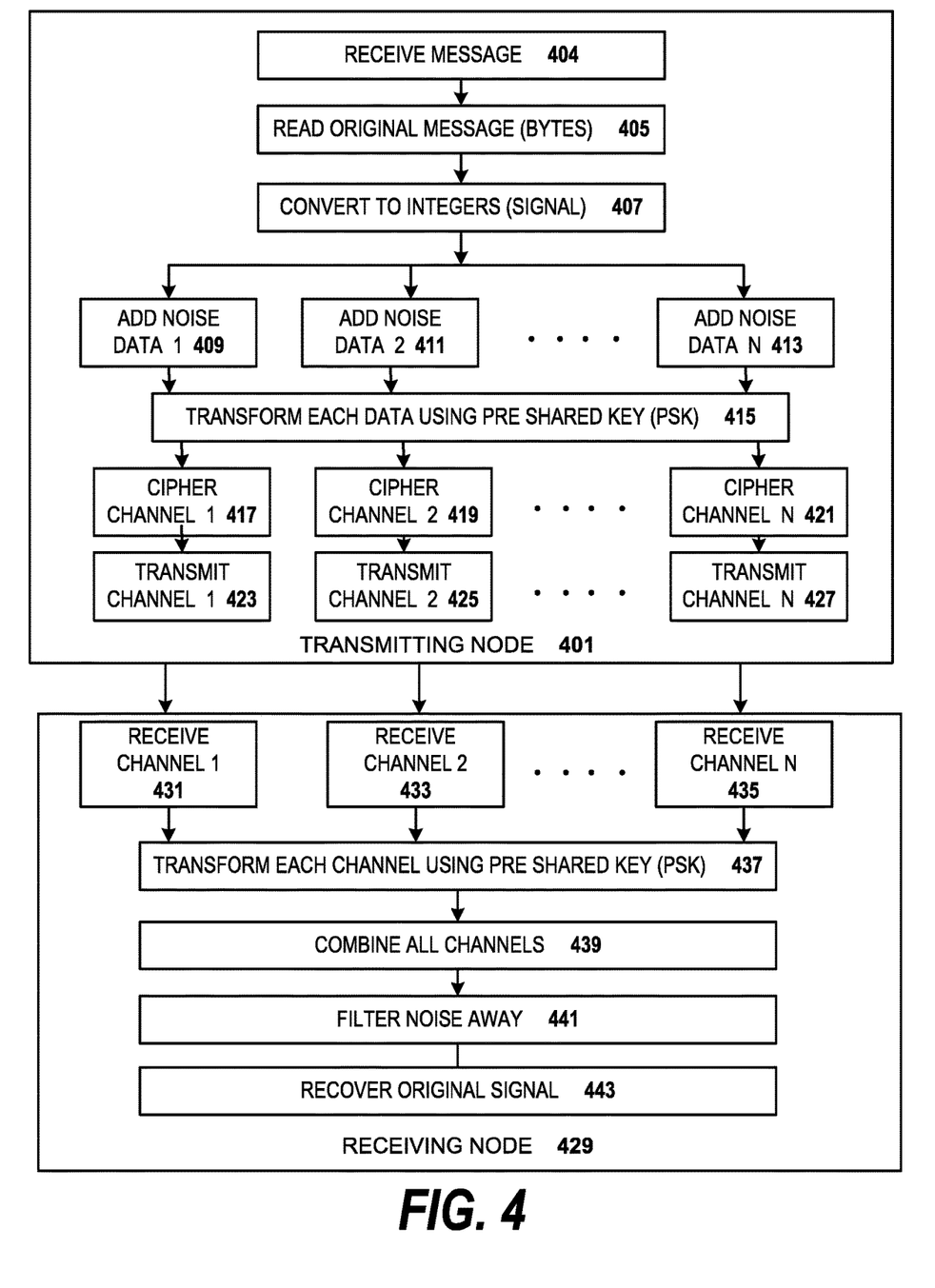
FIG. 4 illustrates a flow diagram of operating an encryption and decryption system according to an embodiment of the invention.

FIG. 4 illustrates a flow diagram of operating an encryption system according to an embodiment of the invention.

In step 403, the transmitting node 301 receives an original message to be encrypted. The original message can be any sequence of bytes (data) converted into integers. The original message is read in a byte-wise fashion in step 405. The original message is converted into a set of numbers in step 407. In this step, embodiments of the invention add a respective offset to each of these numbers (integers) to shift the baseline with respect to the mean of the noise. In embodiments of the invention, the output of step 407 is a sequence called the "original signal".

Next, copies of the original signal are provided to each of a set of channels. In steps 409, 411, 413, different noise data is added to respective copies of the original signal. In embodiments of the invention, a sequence of random numbers is generated to provide the noise data. In other embodiments, a sequence of pseudo-random numbers is generated for the noise data. Although the source of the random or pseudo-random numbers is immaterial to the invention, conventional random and pseudo-random number generators such as a hardware random number generator or a cryptographic hash function can be used in embodiments of the invention. In a previous step, a negotiation or configuration step is used to obtain the appropriate encryption parameters, e.g., the correct SNR for each cipher/channel, the noise envelope range and the phase change of the signal within the noise envelope. In preferred embodiments, the standard deviation of the sequence of random or pseudo-random numbers is generated to be between one half to one third of the lowest number (i.e. amplitude) in the original signal generated in step 407. The noise standard deviation can be fixed once the algorithm to convert the signal, e.g., plaintext bytes to numbers, is decided by the negotiation step which will provide the min and max values of the numbers.

In this set of steps 409, 411, 413, the system creates as many such channels/ciphers as negotiated by the transmitting node 401 and the receiving node 429. In preferred embodiments, typically at least 16 channels are created to ensure that transmission error levels are reduced to eight sigma. In each of these channels, the original signal of the step 407 above is the same, but the random noise data is different for each channel/cipher. Further, the signal is phase-shifted in different amounts in respective channels. Hence, each channel/cipher is different than any other. There is a point of diminishing returns by adding more channels as beyond 8 Sigma SNR in the combined cipher, there is not much advantage in terms of the accuracy of the original signal detection. However, if bandwidth is available, one could start with less than 2 sigma SNR per channel and then increase the number of channels to well beyond 16 to achieve the desired accuracy of the final integrated cipher from the plurality of channels.

In step 415, embodiments use a set of optional pre-shared keys (PSK) to transform each of selected channels to make the signals out of phase with the noise data and/or encrypted in a conventional manner. As will be discussed below, the PSKs and other configuration information are exchanged in a negotiation process. The PSKs come in two types. The first type of PSK dictates the amount of phase-shift within the noise data envelope. The first type of PSK is used in preferred embodiments. The second type of PSK is a conventional type of PSK, e.g., a symmetric or asymmetric key. A given channel can have both types of PSKs, so that the signal can be out of phase with the noise envelope by an amount specified by a first type of PSK and then encrypted by a second type of PSK. The respective PSKs can be unique to the given channel with respect to other channels.

The encryption algorithm which uses the PSK is also chosen by the two parties in communication in the negotiation process. The selected algorithm should be appropriate for the selected PSK and have an inverse algorithm. In preferred embodiments, the configuration information exchanged during the negotiation contains information about the number of channels and transformation information (phase-shift, additional encryption, and physical channel) about each of the channels.

The use of a PSK and an associated encryption algorithm in step 415, is optional and is used only to further obfuscate the data by rotating it out of phase and/or encrypt it among channels.

In the next set of steps 417, 419, 421, the created ciphers are loaded into their respective channels. In steps 423, 425, 427, the transmitting node 401 transmits each of the cipher channels to the receiving node 429. The transmission can happen via different routes in the network. For example, the transmission can be performed via different physical ports, each port assigned to particular channel. Alternatively, time or frequency multiplexing is used to transmit respective cipher channels on a single physical channel. Embodiments of the invention can use header information indicating that a particular block or packet is assigned to a particular channel. Cipher assembly and transmission can be performed over TCP/IP or any other protocols, just as would be done for any regular information transmission. Any conventional means of communication can be used in different embodiments of the invention.

In the next set of steps 431, 433, 435, the respective ciphers are received on their respective channel at the receiving node 429, Once all channels have been received, the receiver uses the respective second type PSK(s) (if applicable) in step 437 to apply the appropriate inverse of the encryption algorithm for each of the encrypted channels to ensure that the data in all channels are decrypted. Then, the first type of PSKs are used to make sure that the ciphers from each of the channels are in phase. The configuration information established in the negotiation phase is used by the receiving node to decrypt and bring the signals in phase for all the channels.

In step 439, the receiving node 429 combines all of the channels together to produce a combined cipher. The transmission for a packet of signal continues until a return hash (checksum) is validated, after which the channel transmission can stop for that channel/cipher. Once combined, the resultant signal to noise ratio (SNR) in the combined cipher should be about 8 or more sigma, assuming that the ciphers started with an SNR more than 2 sigma. An SNR above 8-sigma can be treated as a signal with an error probability of under 0.5 part in a trillion. In the invention, there a relationship between how much noise is added and the number of channels/ciphers used. For example, if the transmitter starts with a 2-Sigma SNR for each channel, then preferred embodiments use at least 16 channels to achieve an 8-Sigma SNR in the combined cipher.

In step 441, the added noise is filtered from the combined signal. In one preferred embodiment, a threshold amplitude is used to filter the combined signal. Any amplitude below the threshold is considered to be noise and is filtered out. To filter the noise out, the receiving node removes all data with amplitudes below a threshold, e.g., 6-sigma, as the signal is expected to be above the threshold, e.g., at or near 8-Sigma level in the combined cipher in embodiments with 16-channels.

Once the noise has been filtered out, the original signal is retrieved, step 443. Any conversion process, e.g., converting the signal expressed as integers to bytes is also performed in this step.

Although the drawing represents the channels as different physical channels, the invention can be adapted to using a single physical channel, e.g., time- or frequency-multiplexed, to transmit a plurality of different ciphers from multiple transmitters to multiple receivers. As discussed above, each of the ciphers may use one or more unique PSK (to that channel). For example, if a command center wants to transmit 4 different commands to 4 different receivers, they can do this using the same set of channels with each receiver having their own PSK to get its channels in phase. It is envisioned that header information is used to route the particular cipher to the correct receiver.

In embodiments of the invention, the transmitter and receiver first establish the minimum and maximum numeric values the plaintext bytes can be transformed to. For instance, if the plaintext bytes are directly converted to their ASCII codes, a range of 0 to 255 is used. However, this is not the only way to get a unique number for a byte, there are alternative ways that embodiments of the invention generate a range of numbers for the plaintext signal value range through any number of unique mappings. Next, the random noise signal is chosen such that its standard deviation is about half the range of the signal numeric values (average of the maximum and minimum). This will give a starting SNR of at the most 2 sigma. Using a standard deviation of about half, and an SNR of 2 sigma, 16 channels has been found to be a good number of channels for embodiments of the invention. The starting SNR is a function of the number of channels; for channels more than 36, the starting SNR of less than 2 sigma could be used in embodiments of the invention.

In preferred embodiments, to disperse the original signal with the random data, and to avoid detection by power spectrum analysis, the size of the sequence of random or pseudo-random numbers (the noise envelope) should be at least four times the size of the original signal or at least 1024 numbers (also known as the array size from a programming point of view) produced in step 407 above, whichever is more. How the original signal is situated within the noise data, e.g., noise data starts and after agreed on number of integers, signal starts, is determined during the negotiation process. Embodiments of the invention intermingle noise and signal according to a spacing established during the negotiation process. That is, the spacing of the noise and the signal can be different for each cipher and the spacing of the signal does not need to be fixed in the entire noise envelope. Each of these parameters, i.e. the signal start index, the separation between subsequent bytes etc., can be encoded in the algorithm via the Pre-Shared-Key (PSK). This sequence of random numbers is also called "noise data" in this disclosure.

While embodiments of the invention combine the noise data and original signal in a variety of ways, preferred embodiments maintain a signal to noise ratio below two sigma. When the noise data is added to the original signal, the original signal can be stretched or shrunk over the range of noise (or vice-versa) to obtain the desired signal to noise ratio. The system pads zeros in the empty regions as desired. Padding by zeros is done to ensure the data-length is maintained at the agreed upon packet size. In this disclosure, the first instance of the combined signal and noise data is the cipher or the encrypted message for channel one, step 409.

In preferred embodiments, a hash mechanism is used as an additional check on the received information. The use of hashes is well known in the art.

FIGS. 5A-7B illustrate the effect of adding more ciphers together in a combined cipher so that the signal becomes statistically significant. In the drawings, a Gaussian noise distribution is used, although in other embodiments of the invention, other types of noise data are used. Also, the random noise signal is chosen such that its standard deviation is about half the range of the signal numeric values (average of the maximum and minimum) and the total number of channels is chosen to be 16. In other embodiments of the invention, the standard deviation of the noise is different with respect to the signal, and the number of channels is different.

Figure 5A:
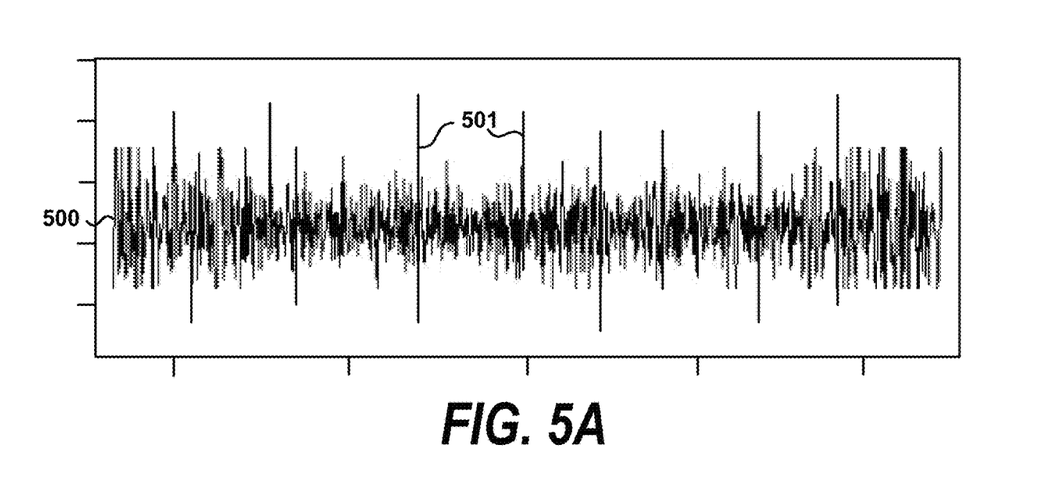
FIG. 5A is a diagram of the ciphertext data integrated over all the channels according to an embodiment of the invention.

FIG. 5A is a diagram of the ciphers combined over all the channels according to an embodiment of the invention, i.e. the combined cipher 500. In the drawing, the combined cipher 500 shows spikes 501 where the copies of the signal are added from each of the channel ciphers. The added noise data tends to average out over all of the ciphers and is of lower amplitude.

Figure 5B:
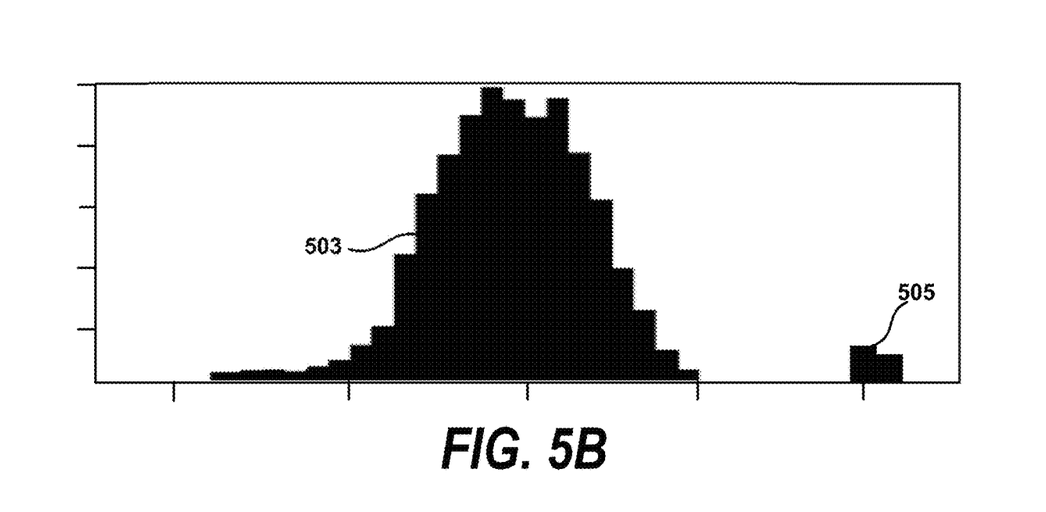
FIG. 5B is the histogram of the ciphertext data after integration over all the channels according to an embodiment of the invention.

FIG. 5B is the histogram of the ciphertext data after integration over all the channels according to an embodiment of the invention. Notice that over all the channels, the distribution closely resembles a Gaussian distribution 503 for the noise data. The signal data distribution 505 is at an 8 Sigma distance from the mean of the noise distribution 503 and so is statistically significant. The noise data 503 is clustered at a smaller standard deviation than the signal data 505. The histogram shows that the amount of noise data 503 is greater than the signal data 505 and thus effectively masks the signal within any given cipher.

Figure 6A:
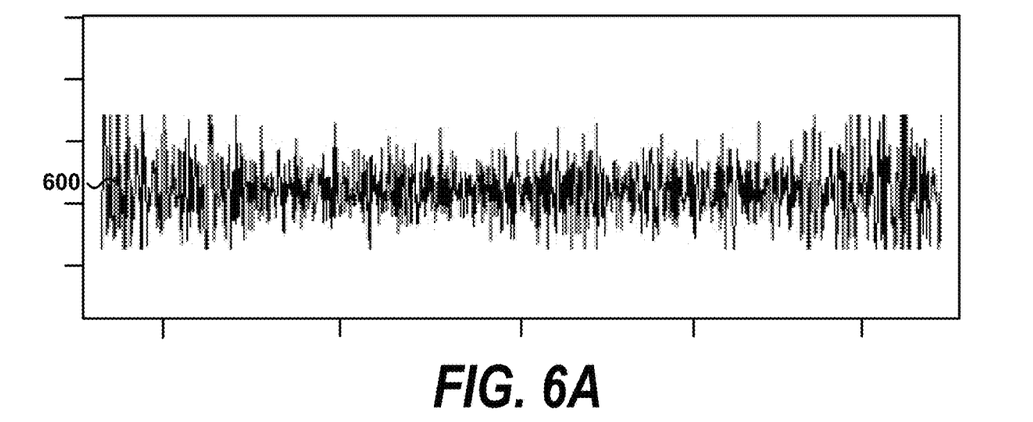
FIG. 6A is a diagram of the ciphertext data integrated over a few of the channels according to an embodiment of the invention.

FIG. 6A is a diagram of the ciphers integrated over a few channels (e.g., five channels) according to an embodiment of the invention. In this example, too few channels are used, so in the combined cipher 600 there is not enough discrimination between the signal and the noise. In this diagram, there are too few channels so the spikes representing the signal are not found in the combined cipher 600.

Figure 6B:
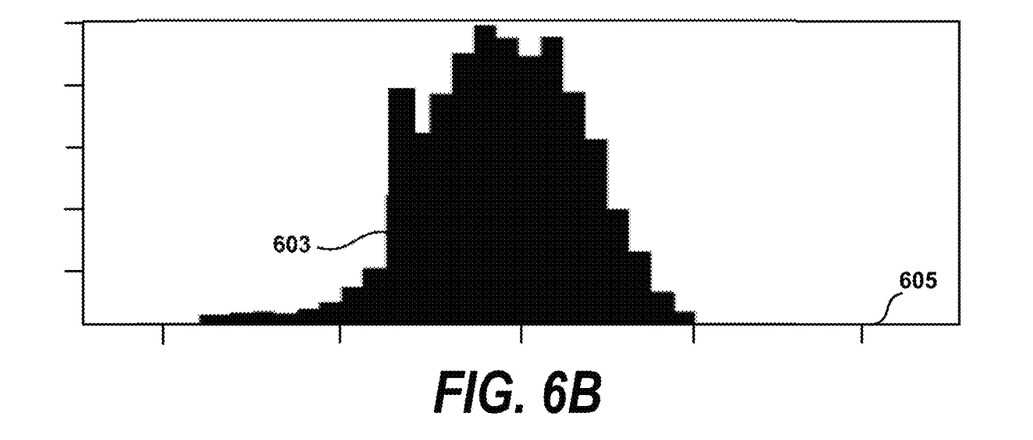
FIG. 6B is the histogram of the ciphertext data after integration over a few of the channels according to an embodiment of the invention.

FIG. 6B is the histogram of the ciphertext data after integration over a few channels according to an embodiment of the invention. In this drawing, notice that the signal data is added and becomes part of the Gaussian distribution, indicating that the signal is not sufficiently well hidden in the noise with only a few channels. At the 8 Sigma position 601 there is no signal data as an insufficient number of channels have been added into the combined cipher.

Figure 7A:
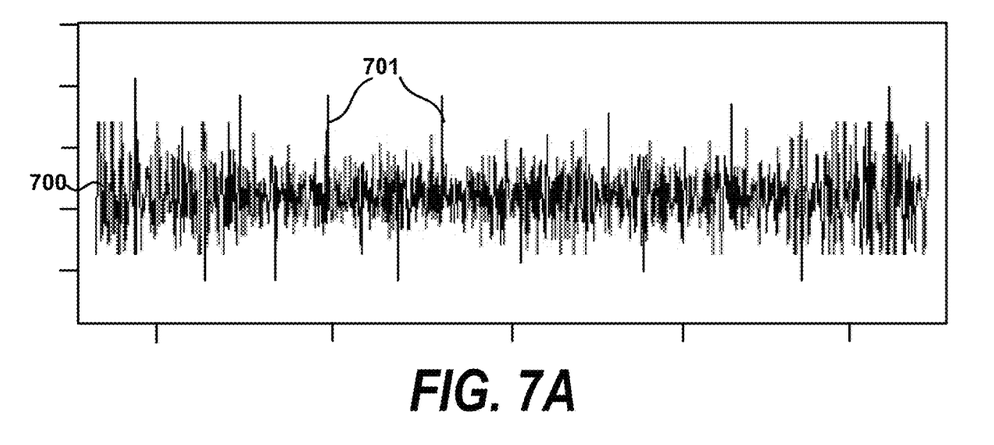
FIG. 7A is a diagram of the ciphertext data integrated over a greater number of the channels according to an embodiment of the invention.

FIG. 7A is a diagram of the data integrated over a greater number of channels than the drawings in FIGS. 6A and 6B (but fewer than in FIGS. 5A and 5B, e.g., 10 channels) according to an embodiment of the invention. In this drawing, notice that the spikes 701 (i.e., the signal) in the combined cipher 700 are growing as compared to the background noise, indicating that signal is becoming stronger when more channels are used.

Figure 7B:
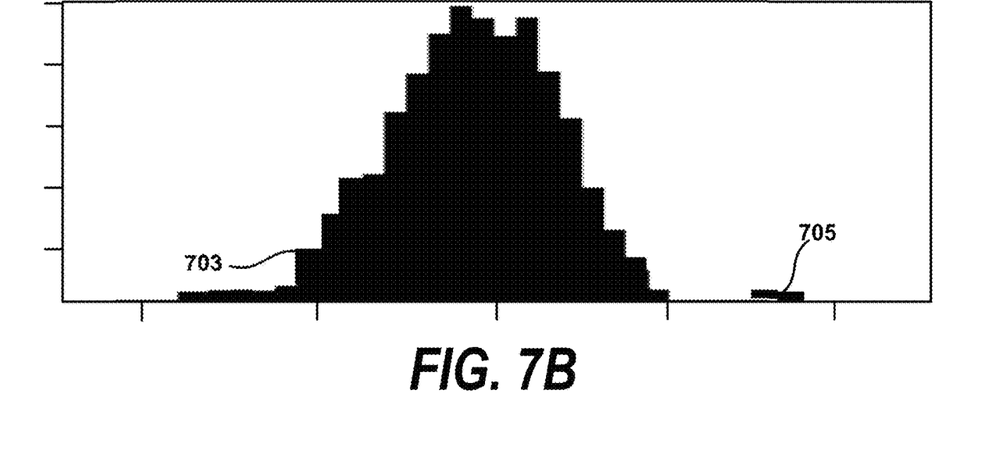
FIG. 7B is the histogram of the ciphertext data after integration over a greater number of the channels according to an embodiment of the invention.

FIG. 7B is the histogram of the ciphertext data after integration over a greater number of channels according to an embodiment of the invention. The Gaussian curve 703 represents the noise data. Also as shown in the drawing, some of the signal amplitudes 705 are beginning to drift away from the noise curve 703 indicating that the signal is beginning to be more statistically significant. In some embodiments of the invention, this degree of statistical significance is adequate, however, in preferred embodiments, more channels are used to increase the discrimination between signal and noise.

Figure 8:
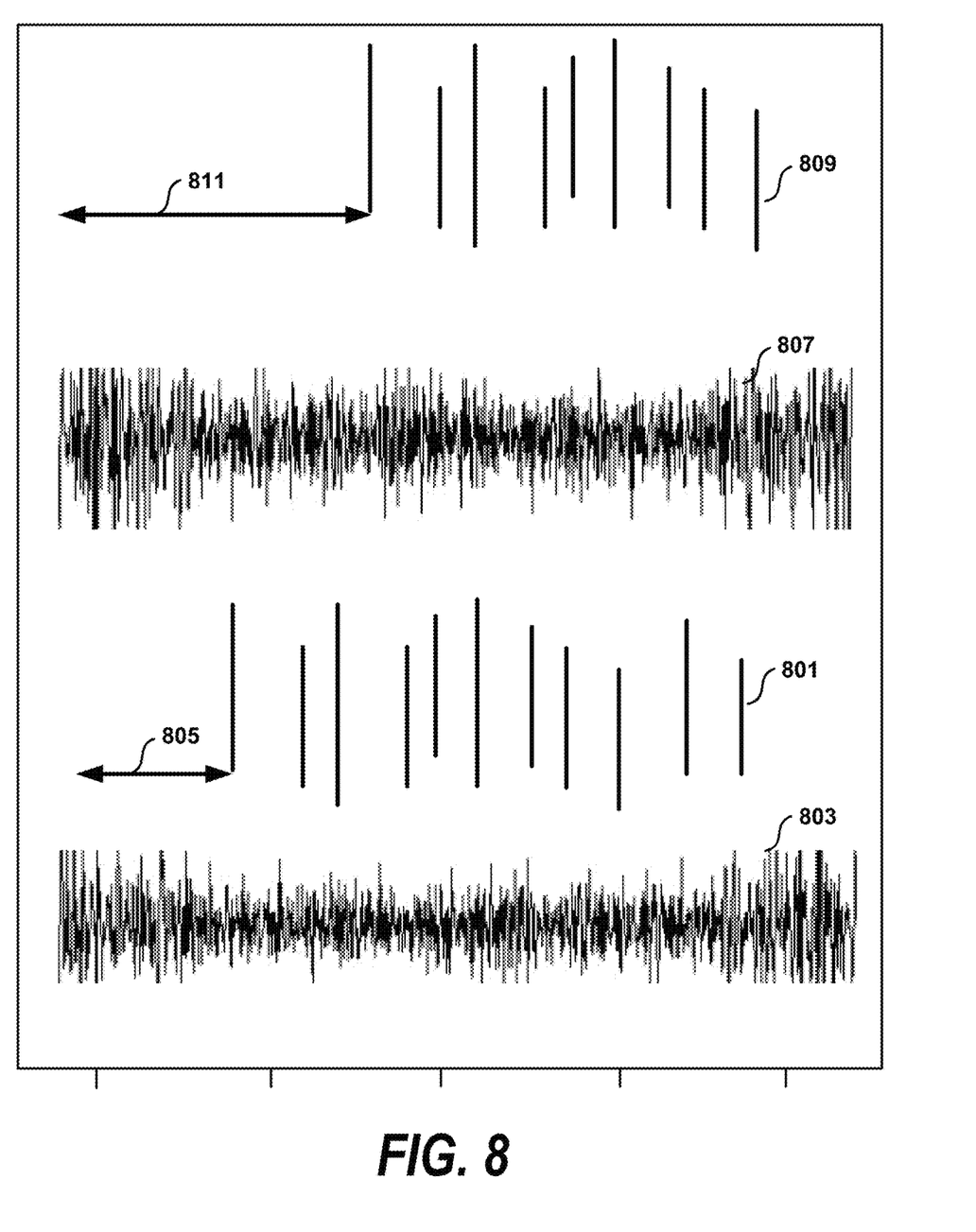
FIG. 8 is a diagram of phase shifting the original signal within a noise data envelope according to one embodiment of the invention.

FIG. 8 is a diagram of phase shifting the original signal within a noise data envelope according to one embodiment of the invention. As shown in the drawing, two copies of the signal are combined with two different noise data envelopes and phase shifted by different amounts. The amplitudes of the noise data envelopes are chosen to be one-half to one-third the amplitudes of the signal, that is, the drawing is not necessarily to scale.

The first signal copy 801 is added to the first random or pseudo-random noise data 803, after a phase shift 805 is used to displace the signal copy 801 within the noise data envelope 803. The second signal copy 809 is added to a second random noise data 807 after a phase shift 811. The second phase shift 811 is a greater amount to the right with respect to random noise data envelope 807. In preferred embodiments of the invention, the amount of the phase shift for a respective channel will vary from channel to channel and is specified by the first type of PSK. Since the noise data envelope is preferably larger than the original signal, the original signal can be phase shifted by different amounts in different channels. Note that first signal copy 801 and second signal copy 809 are identical (except for the phase shift), while noise data envelopes 803, 807 are different.

In preferred embodiments of the invention using a phase shift type PSK, it is important that the receiving node receives the information concerning which phase shift type PSKs are used in which channel. Typically, this will occur in the negotiation/configuration phase. There are a near infinite number of possible phase shifts within a particular noise data envelope. Without the phase shift information, the ciphers will not be aligned correctly and the cipher information of other receivers will effectively act as noise.

Figure 9:
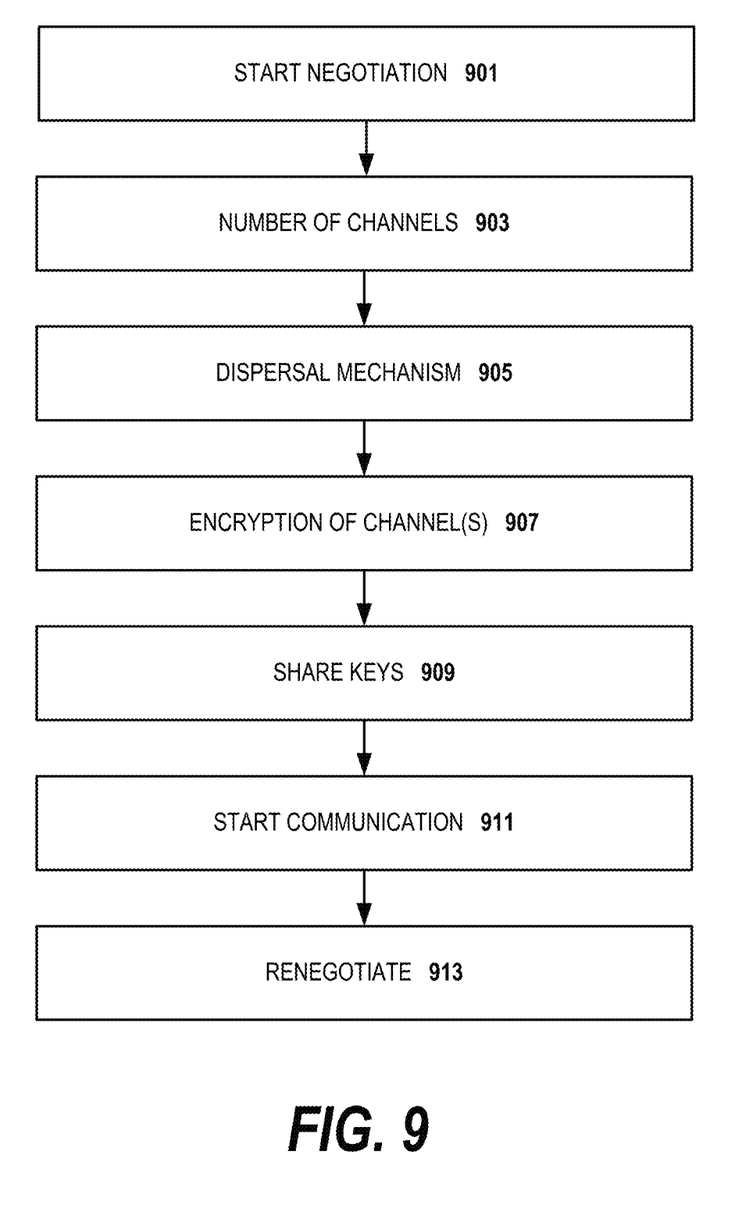
FIG. 9 is a flow diagram of one embodiment for negotiating the parameters of the communication between nodes.

FIG. 9 is a flow diagram of one embodiment for negotiating the parameters of the communication between nodes. The transmitting node and the receiving node start the negotiation of the encryption protocol in step 901. In embodiments of the invention, the negotiation is similar to an SSL/TSL handshake in which each party establishes which protocols they can support. In other embodiments, where it is known that each participant is similarly equipped, the "negotiation" can take the form of the ones of the nodes, e.g., the transmitting node, sending the other node, e.g., the receiving node, the configuration parameters. In step 903, the number of channels or ciphers that will be created in the encrypted messages is established. As discussed above, the number of channels used has an impact on the signal to noise ratio used in creating a respective cipher. Next, the dispersal mechanism used for transmitting the ciphers is agreed by the transmitting and receiving nodes, step 905. As an optional step, some or all of the channels may be encrypted. Thus, the channels, the encryption algorithms and the pre-shared key(s) are agreed upon in the encryption of channel(s) step 907. The algorithms and keys are symmetric or asymmetric in different embodiments of the invention. In preferred embodiments of the invention, only selected channels are encrypted; in other embodiments, all of the channels are encrypted. Where a plurality of channels are encrypted, respective channels may use the same or different encryption algorithms and the same or different pre-shared keys. Next, in those embodiments where respective channels are encrypted, one or more keys are shared in step 909.

Once the parameters of the encryption protocol have been established by the transmitting and receiving nodes, they start communication, step 911, using the agreed upon protocol. Communication can be one-way communication from the transmitting node to the receiving node, or can be two-way communication between the nodes. In some embodiments, to add extra security, the protocols are different depending on the direction of the communication. For example, communication going from Node A to Node B uses a first protocol with a respective number of channels, encryption algorithms, encrypted channels and keys, while communication going from Node B to Node A uses a second protocol with a different set of channels, encryption algorithms, encrypted channels and keys.

Finally, for added security, some embodiments start renegotiation of the protocol, step 913, on a periodic or session-wise basis. Thus, in those embodiments, with the beginning of a new period or a new session, the above process is repeated to negotiate a new encryption protocol.

Mixing signals with noise to hide information is a common technique, implemented in techniques such as one-time cipher pads, steganography and spread spectrum transmission. However, the present invention differs significantly in that each channel contains the complete signal. This not only prevents data loss during transmission, but it allows for time multiplexed transmission to avoid snooping.

While the description above describes a computer program implementation, other embodiments of the invention are implemented in a pure analog system (without using a computer program) for transmission such as using an RF communication system where a computer is not involved. That is, an analog system would replace the computer implemented nodes as described above. For example, in one embodiment of the implementation of the invention, a multi-channel Radio Frequency transmission is used with each channel containing a dispersed signal combined with noise with a sufficiently low SNR, (for example, an SNR of 2.0, so as to hide the signal well below the noise level). On the receiving end, the predetermined number of channels, as well as the corresponding dedispersion of each channel, could be implemented using electronic circuits or computer algorithms based on a pre-shared key (PSK).

While a preferred operating environment and use case have been described, the techniques herein may be used in any other operating environment in which it is desired to deploy services.

As has been described, the functionality above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for secure communication comprising:
receiving a message for transmission from a transmitting node to a receiving node;
splitting the message into a plurality of channels, each channel receiving an identical copy of the message;
adding noise data to each copy of the message, each noise data different for a respective identical copy of the message than any other copy of the message, each respective different noise data added to a respective identical copy of the message producing a unique cipher of a plurality of ciphers for a respective channel of the plurality of channels;
selecting respective channels to be encrypted;
encrypting the selected channels; and
transmitting the unique ciphers via the respective channels from the transmitting node to the receiving node.

2. The method as recited in claim 1, further comprising:
receiving the unique ciphers from the plurality of channels by the receiving node;
combining the unique ciphers to produce a combined cipher; and
filtering noise data from the combined cipher according to an amplitude of data in the combined cipher to retrieve the message.

3. The method as recited in claim 1, wherein respective copies of the message are phase shifted by different respective amounts within respective noise data envelopes, wherein a phase shift determines where a respective copy of the message starts within a respective noise envelope.

4. The method as recited in claim 1, further comprising:
selecting respective channels of the plurality of channels to be encrypted; and
encrypting the selected channels.

5. The method as recited in claim 2, further comprising:
determining that a respective channel is encrypted; and
decrypting the respective channel to produce a decrypted cipher prior to combining the decrypted cipher to produce the combined cipher.

6. The method as recited in claim 2, further comprising conducting a negotiation between the transmitting node and the receiving node in which a set of encryption parameters are agreed.

7. The method as recited in claim 6, wherein the encryption parameters include selected ones of a number of channels, a signal to noise ratio for a channel, a phase shift for a channel, whether a respective channel is encrypted, an encryption algorithm for a respective channel and a key for a respective channel.

8. The method as recited in claim 6, further comprising renegotiating the set of encryption parameters at one of a predetermined interval or a new session.

9. The method as recited in claim 1, wherein a signal to noise ratio of the noise data is selected by adding noise having a data amplitude between one half to one third of a lowest data amplitude in a respective copy of the message.

10. An apparatus, comprising:
a processor;
computer memory holding computer program instructions executed by the processor for secure communication, the computer program instructions comprising:
program code, operative to receive a message for transmission from a transmitting node to a receiving node;
program code, operative to split the message into a plurality of channels, each channel receiving an identical copy of the message;
program code, operative to add noise data to each copy of the message, each noise data different for a respective copy of the message than any other copy of the message, each respective different noise data added to a respective identical copy of the message producing a unique cipher of a plurality of ciphers for a respective channel of the plurality of channels;
program code, operative to select respective channels to be encrypted; and
program code, operative to encrypt the selected channels; and program code, operative to transmit the unique ciphers via the respective channels from the transmitting node to the receiving node.

11. The apparatus as recited in claim 10, further comprising:
   program code, operative to receive the unique ciphers from the plurality of channels by the receiving node;
   program code, operative to combine the unique ciphers to produce a combined cipher; and
   program code, operative to filter noise data from the combined cipher according to an amplitude of data in the combined cipher to retrieve the message.

12. The apparatus as recited in claim 10, wherein respective copies of the message are phase shifted by different respective amounts within respective noise data envelopes, wherein a phase shift determines where a respective copy of the message starts within a respective noise envelope.

13. The apparatus as recited in claim 11, wherein the encryption parameters include selected ones of a number of channels, a signal to noise ratio for a channel, a phase shift for a channel, whether a respective channel is encrypted, an encryption algorithm for a respective channel and a key for a respective channel.

14. A computer program product comprising a non-transitory computer readable medium for use in a data processing system, the computer program product holding computer program instructions executed by the data processing system for secure communication, the computer program instructions comprising:
   program code, operative to receive a message for transmission from a transmitting node to a receiving node;
   program code, operative to split the message into a plurality of channels, each channel receiving an identical copy of the message;
   program code, operative to add noise data to each copy of the message, each noise data different for a respective copy of the message than any other copy of the message, each respective different noise data added to a respective identical copy of the message producing a unique cipher of a plurality of ciphers for a respective channel of the plurality of channels;
   program code, operative to select respective channels to be encrypted; and
   program code, operative to encrypt the selected channels; and
   program code, operative to transmit the unique ciphers via the respective channels from the transmitting node to the receiving node.

15. The computer program product as recited in claim 14, further comprising:
   program code, operative to receive the unique ciphers from the plurality of channels by the receiving node;
   program code, operative to combine the unique ciphers to produce a combined cipher; and
   program code, operative to filter noise data from the combined cipher according to an amplitude of data in the combined cipher to retrieve the message.

16. The computer program product as recited in claim 14, wherein respective copies of the message are phase shifted by different respective amounts within respective noise data envelopes, wherein a phase shift determines where a respective copy of the message starts within a respective noise envelope.

17. The computer program product as recited in claim 15, wherein the encryption parameters include selected ones of a number of channels, a signal to noise ratio for a channel, a phase shift for a channel, whether a respective channel is encrypted, an encryption algorithm for a respective channel and a key for a respective channel.

18. The computer program product as recited in claim 15, wherein the number of channels is large enough to achieve the desired signal accuracy.

* * * * *